June 24, 1941.    G. J. BAIR    2,247,270
SILICEOUS BODY
Filed Aug. 11, 1938    4 Sheets-Sheet 1
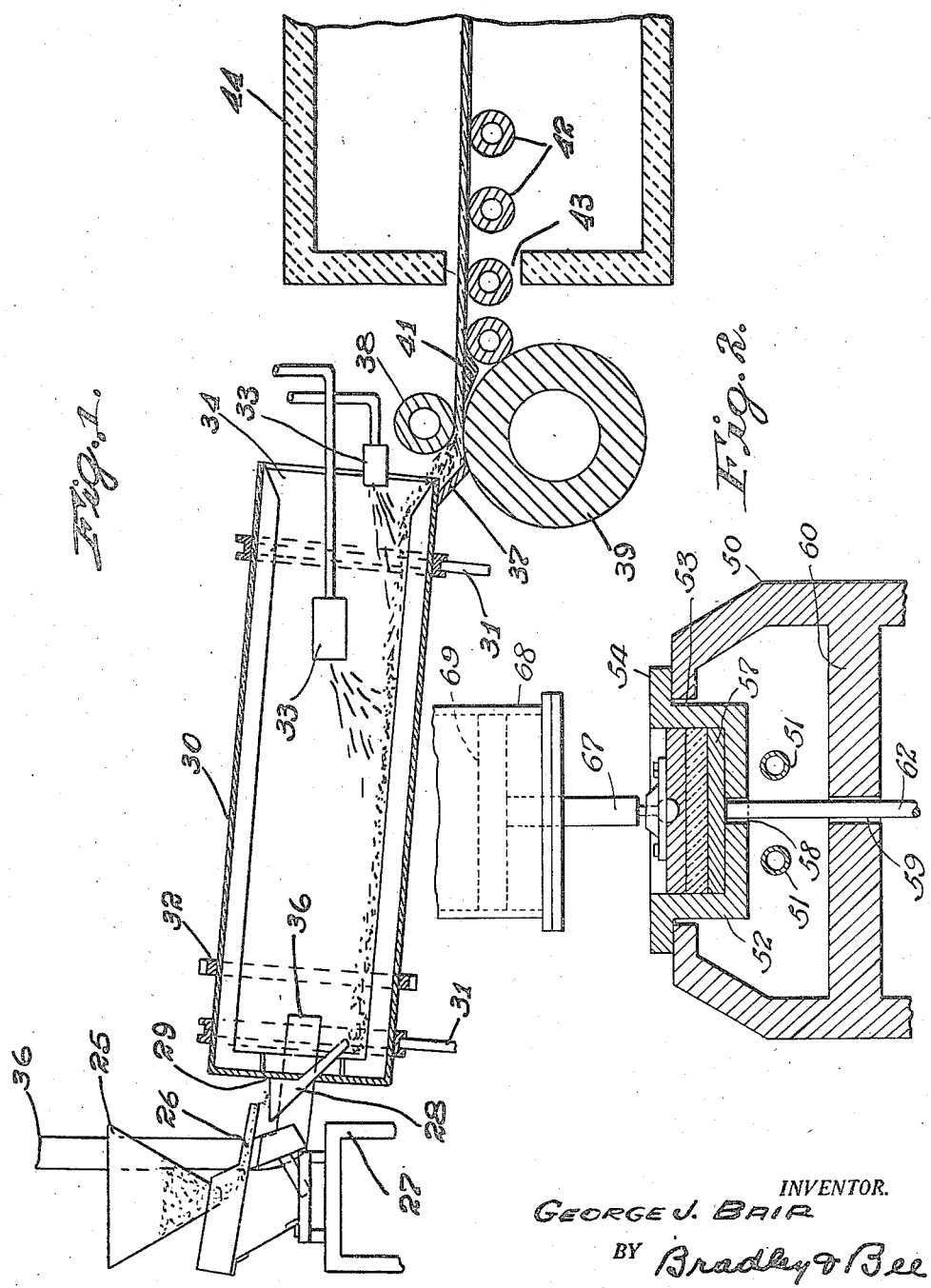
INVENTOR.
GEORGE J. BAIR
BY Bradley & Bee
ATTORNEYS.

June 24, 1941.    G. J. BAIR    2,247,270
SILICEOUS BODY
Filed Aug. 11, 1938    4 Sheets-Sheet 2
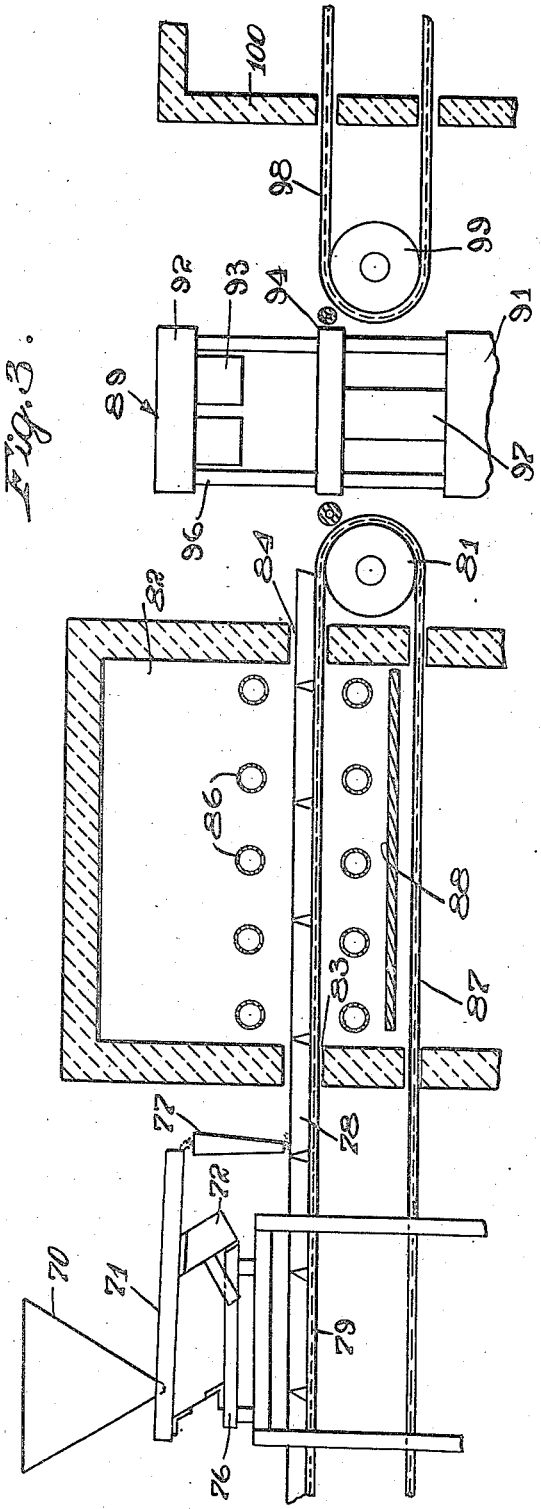
Fig. 3.
Fig. 4.
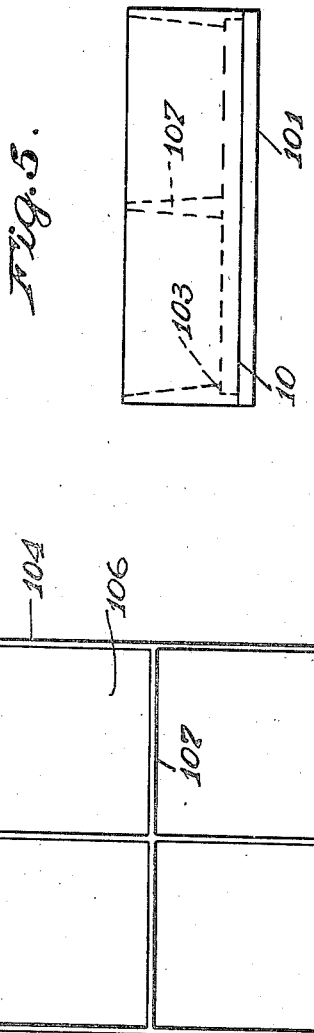
Fig. 5.
INVENTOR.
GEORGE J. BAIR
BY Bradley & Bee
ATTORNEYS.

June 24, 1941.     G. J. BAIR     2,247,270
SILICEOUS BODY
Filed Aug. 11, 1938     4 Sheets-Sheet 4

INVENTOR.
GEORGE J. BAIR
BY Bradley & Bee
ATTORNEYS.

Patented June 24, 1941

2,247,270

UNITED STATES PATENT OFFICE 2,247,270

SILICEOUS BODY

George J. Bair, Pittsburgh, Pa., assignor to Norbert S. Garbisch, Butler, Pa.

Application August 11, 1938, Serial No. 224,308

4 Claims. (Cl. 49—77)

The present invention relates to the manufacture of artificial siliceous bodies and it has particular relation to the manufacture of bodies suitable for use as substitutes for conventional ceramic wares.

One object of the invention is to provide a process of utilizing the broken-down and heretofore substantially valueless mixture of finely divided silica and glass obtained in the grinding operations involved in the finishing of such sheets or plates of glass as are employed in the glazing of automobiles, windows of buildings and the like.

A second object of the invention is to provide a body similar to conventional ceramic products, but which is characterized by an exceptionally high degree of resistance to chemical and physical deterioration and which possesses unusual mechanical strength.

These and other objects of the invention will be apparent from the consideration of the following specification and the appended claims.

In the finishing of the better grades of sheet or plate glass, it is customary to subject the plates to a grinding operation in order to reduce or eliminate the irregularities in the surface thereof. The grinding operation customarily is effected by cementing the plates of glass to moving cars or tables which are then passed under revolving disks or runners of casting iron. A slurry or suspension of sand and water is simultaneously supplied to the surface of the glass and this slurry, under the pressure of the runners, gradually abrades away the irregularities. The abrasion involves the removal of minute chips or slivers of glass and is also accompanied by the wearing down and breaking up of the particles of sand into finer and finer states of subdivision. From time to time the mixture is subjected to a classification operation in which the coarser particles are separated and are returned for reuse in the cycle. The finer material is advanced for use in subsequent stages in making the finer cuts in the grinding operation, or if the particles are too fine for the latter, they are discarded. Ultimately all of the sand is thus broken down to such fine state of subdivision that it can no longer be employed in the grinding of glass. The mass usually consists of an extremely intimate mixture of glass and sand containing about 12 to 20 per cent of glass and small amounts (e. g.) about 2 or 3 per cent of iron. This iron may be in the form of oxides, such as occur naturally in many sands, or it may comprise minute fragments of metallic iron broken away from the cast iron runner blocks. A small amount of plaster from the grinding tables, organic matter, and other waste material is also present. The particle size of the solids in this mixture is such that nearly all of it will pass through a screen of 300 or 325 mesh.

Heretofore the impure mixture of siliceous particles thus obtained has been considered as being of no value and has been run to waste upon dumps or into streams. In either event, since hundreds of thousands of tons are produced annually it has constituted a serious nuisance about the glass plant.

The present invention involves the discovery that the wastes from the grinding and polishing of glass, upon heating under appropriate conditions, become bonded together into bodies suitable for use as substitutes for ordinary ceramic products and for other purposes.

For a better understanding of the invention reference may now be had to the accompanying drawings, in which:

Figure 1 is a cross-sectional view of an apparatus for heating and pressing waste sand to form a continuous strip.

Figure 2 is a cross-sectional view of a convenient form of press suitable for use in shaping the heated waste material into plates or plaques.

Figure 3 diagrammatically illustrates an embodiment of apparatus suitable for use in compressing waste sand into plates or plaques.

Figure 4 is a plan view of a mold suitable for use in shaping a tile-like body in the process herein disclosed.

Figure 5 is an elevational view of the mold disclosed in Figure 4.

Figure 6:
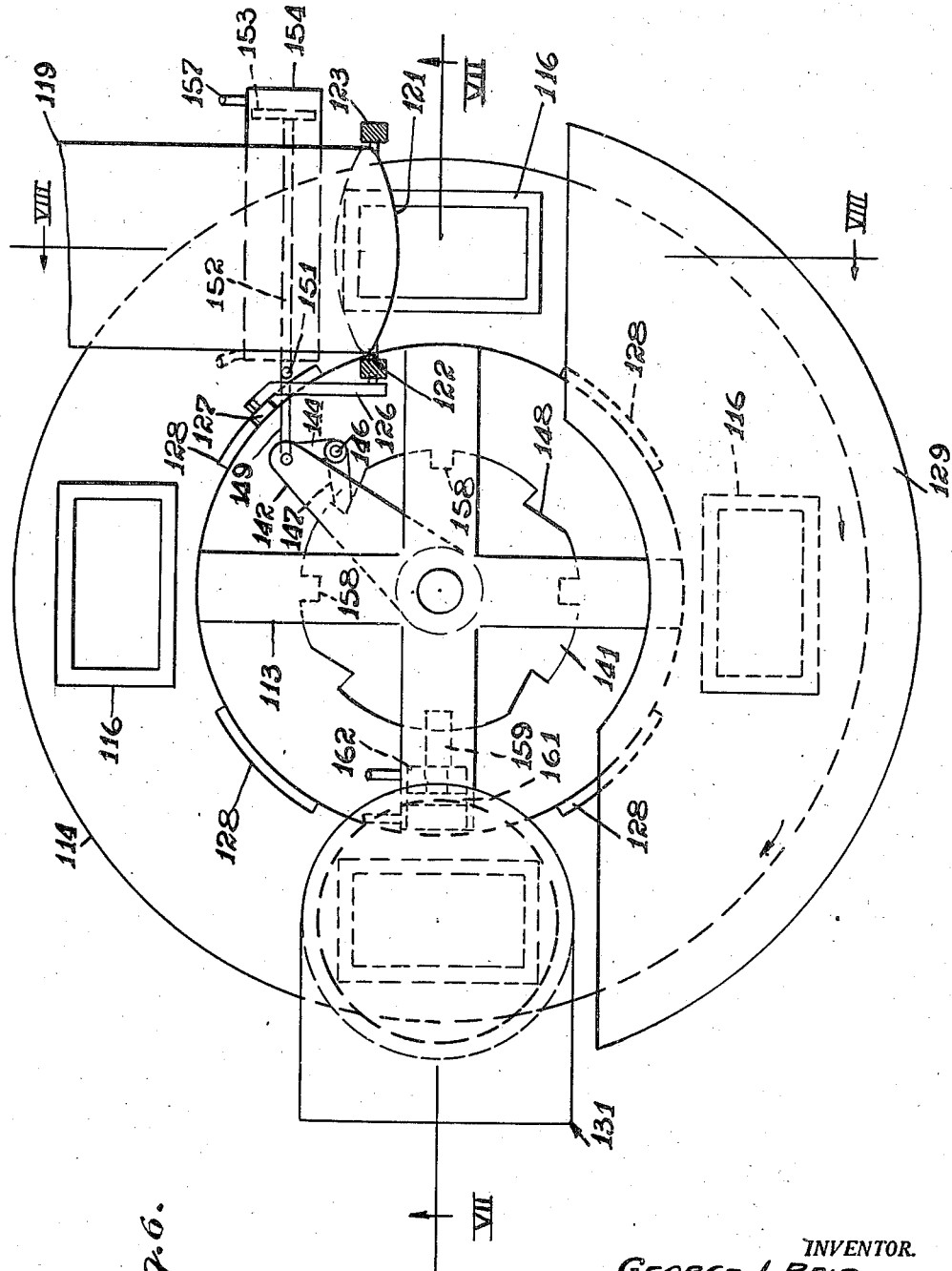

Figure 6 is a plan view of a further embodiment of the invention.

Figure 7:
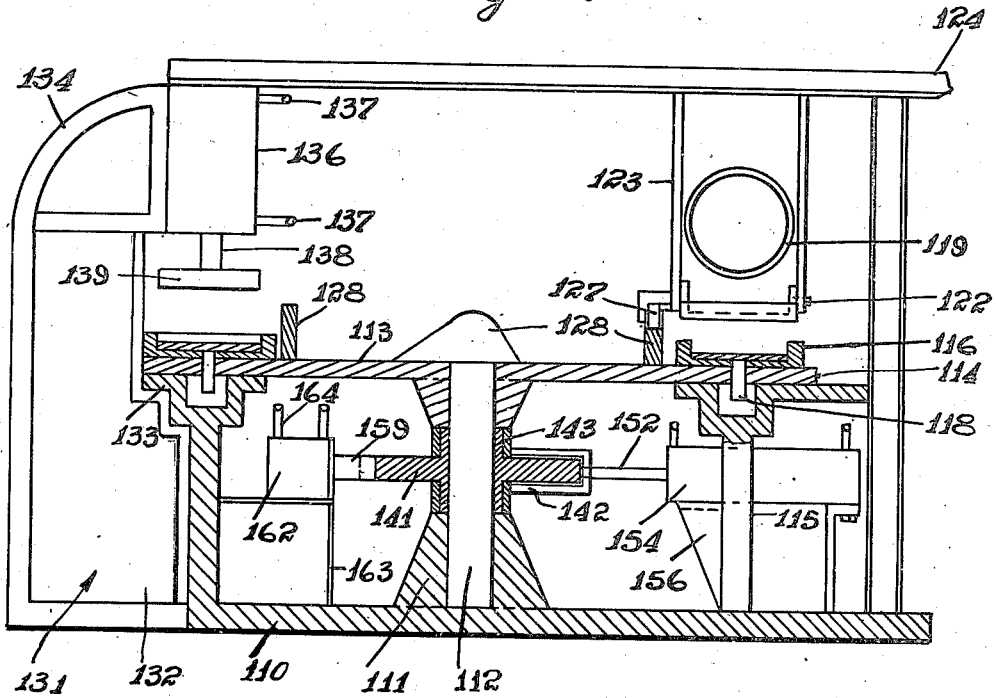
Figure 8:
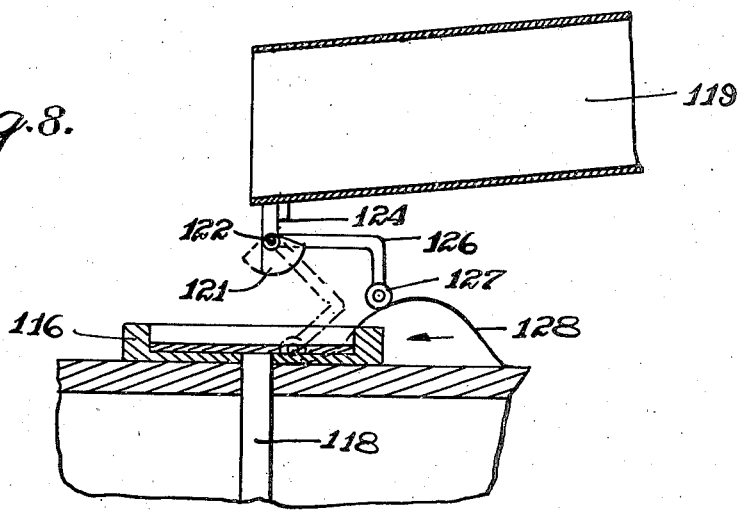

Figure 7 is a cross-sectional view substantially upon the line VII—VII of Fig. 6, and Figure 8 is a fragmentary cross-sectional view upon the line VIII—VIII of Fig. 6.

In the drawings like numerals indicate like parts throughout.

The waste material employed in preparing the new product may be taken directly from the grinding tables and dried for use, or material which has been stored in dumps may be employed. The material is susceptible of use without preliminary treatment; however, in order to provide a white product, it may be desirable to remove the iron contained therein. The major portion of the metallic iron is easily removed by treating sand while in suspension in water, or after it has been dried, with a magnetic separator. However, in order to remove nonmagnetic compounds of iron, the material should be chemically treated—for example, with dilute (5 or 10%) sulfuric acid.

This sand, as previously stated, contains about 12 to 20 per cent of very finely divided glass and this is sufficient under appropriate conditions to bond together the particles of silica, to provide a strong durable body. However, if it is desired further to reduce the porosity of the final product, additional quantities of ground glass or even ground blast furnace slag may be incorporated. A convenient method of making the addition would involve stirring the glass or slag with the slurry or suspension of sand as it is received from the grinding tables. The amount of added material is variable over practically any range from substantially zero to substantially one hundred per cent of the entire mass.

Various processes may be employed in forming the waste sand into unitary bodies. One such process involves the preliminary admixture of the material after the water has been eliminated therefrom with a suitable temporary binder such as tar, asphalt or the coke-like residues from the distillation of petroleum. These binders are merely temporary in character and hold the waste material to shape preliminary to and during the early stages of the firing or heating operation. Ultimately they are substantially completely evaporated or burned away to leave a body consisting essentially of very fine particles of silica bonded together by the sintered glass particles contained therein.

The ratio of bonding agent employed is susceptible of considerable variation. About 1 to 10 per cent is considered to be satisfactory. A convenient method of incorporating the bonding agent involves solution in a suitable solvent such as benzene or gasoline, which will penetrate the interstices between the particles comprising the waste material. After the latter has become sufficiently permeated, the solvent may be evaporated and then recovered by distillation. The particles of waste material are thus provided with uniform coatings of bonding material which at their points of contact cement the mass into a unitary whole, that can be shaped and handled preliminarily to the firing operation.

Bodies of the bonded material of appropriate shape, e. g. plates or plaques may be deposited upon shelves or other supports in a kiln and heated to an appropriate temperature. They may also be deposited in shells or molds of heat-resistant material such as chrome steel and then fired. Firing should be effected at a temperature above the sintering point of the glass, e. g. at a temperature of 1600° or 1800° F. At these temperatures the organic bonding agent is completely burned away and the particles of glass are sintered or fused and leave a somewhat porous body consisting of particles of silica bonded together by connecting particles or coatings of glass. The bodies may be annealed by gradual cooling from a temperature of about 1600° F.

The bodies are useful as heat and sound insulating media in buildings. The porous structure may also be impregnated with catalytic substances such as vanadium oxide and the like, and employed as catalysts in such chemical reactions as the catalytic oxidation of naphthalene to form phthalic anhydride or the oxidation of sulfur dioxide to form sulfuric acid anhydride. The use of the bodies for scouring bricks, abrasives and other purposes is also contemplated.

If desired, organic binders may be replaced by inorganic binders such as sodium silicate. The latter is best incorporated as a water solution which can be dried by application of heat or in any other convenient manner to leave a mass consisting of particles of silica and glass bonded together by solid sodium silicate. This mass is subjected to firing, as above described. During the firing operation the sodium silicate acts as a flux and assists materially in bonding the particles of finely divided material together. It will be apparent that lime in appropriate amounts may be used alone or included along with the sodium silicate and it, under the conditions of operation, will tend to combine with sodium silicate (if the latter is present) to form an additional amount of glass, which will assist in the bonding action.

If preferred, the use of preliminary or temporary bonding agents may be dispensed with and firing be conducted directly upon the loose or unbonded waste material. However, in the latter case, it is usually desirable, though not always necessary, to employ a container of appropriate shape and size for the material. This container should be of heat-resistant material, such as chrome steel or a ceramic body. In order to prevent adhesion of the material to the container during the firing operation the container may be preliminarily coated with a heat-resistant material such as fine silica, magnesia, gypsum, graphite, or it may be merely washed with a water suspension of lime (calcium hydrate).

The density of the final product may be increased by subjecting the material preliminary to the firing operation to mechanical pressure, for example, in a hydraulic press or by subjecting it to mechanical vibration in order thoroughly to shake down and settle the particles.

In the form of the invention disclosed in Fig. 1, the waste sand in purified or unpurified state is preliminarily heated, for example, in a rotary kiln to the sintering temperature of the glass content and is then passed between rollers in order to compress it into a coherent body which may be annealed and then cut up into plates or tiles of appropriate sizes and configurations. In this embodiment of apparatus, waste sand in the wet state may be fed into the kiln and there dried and finally heated to an appropriate temperature. However, it may, also, be preliminarily dried and supplied to hopper 25 of conventional design, which at its lower end discharges into an electrically vibrated feeder trough 26 of the "Syntron" type, upon a platform 27. The material is discharged from the trough 26 into a chute 28, which discharges through a fixed plate 29 in the upper extremity of a rotary kiln 30. The kiln is supported upon rollers 31 in conventional manner and is driven by a ring gear 32 which meshes with a driven pinion (not shown).

Heat may be supplied to the material within the kiln in various ways. For example, the finely divided waste material may be mixed with pulverized coal before introduction into the hopper 25 and air may be supplied to the mass in the kiln in order to support combustion of the coal. Likewise gas or oil, or pulverized coal burners 33 may be inserted through the upper or lower end 34 of the kiln to supply heat.

The gases of combustion from the kiln are permitted to escape through a flue 36 of conventional design extending through plate 29.

The material, heated to the sintering temperature of the glass content, discharges at a relatively uniform rate from the lower extremity of the kiln upon a baffle plate 37 of heat-resistant material that directs it between upper and lower pressure rollers 38 and 39, which are driven by any convenient means (not shown). The material in passing between these rollers is compressed and compacted into a coherent strip which is carried over a bar 41 to a series of conveyor rollers 42. These rollers are driven at an appropriate rate and conduct the strip through an opening 43 in the front wall of an annealing leer 44 of conventional design. In the latter the material is gradually cooled in order to reduce internal stresses occurring therein.

In the form of the invention shown in Fig. 2 waste sand is disposed within a suitable mold and is there heated to the sintering temperature of the glass, after which it is subjected to pressure exerted by a hydraulic press, in order to compact it and to effect thorough contact between the particles of glass and silica. This apparatus may comprise a heating chamber 50 of steel or iron, of construction sufficiently strong to enable it to function as the bed portion of a hydraulic press. Within the chamber are disposed heating elements such as electrical resistances, or as shown in the drawings a series of gas or oil-fired burners 51.

Waste sand, for formation of plates, or tiles, or other bodies, is introduced into a mold 52 of chrome steel or other strong, but heat-resistant, material which fits within an opening 53 in the chamber 50, in such manner that the bottom thereof is supported in proximity to the burners 51. It is also provided with a flange 54 extending about the upper edge thereof and engaging the upper portion 56 of the heating chamber. The mold is further provided with a follower 57 resting upon the bottom thereof and openings 58 and 59 formed respectively in the bottom of the mold and in the bottom 60 of the chamber 50 permit the temporary or permanent insertion of a rod 62 for purposes of elevating the follower in order to remove plates or plaques from the molds after they have been formed. It will be apparent that the rod may be attached integrally to the follower, or if desired may be employed as a separate unit that may be inserted or removed at will.

Pressure is applied to the material within the mold by means including a pressure head, connected by ball and socket connection to a plunger 67. The latter extends into a cylinder 68 at its upper end and is provided with a piston head 69, which is actuated by fluid under compression in order to apply pressure to the material in the mold.

In the operation of this embodiment of the invention, waste sand may be introduced in loose or pulverulent state into the mold 53, or if preferred, it may be preliminarily formed into tablets or plates, for example, by admixture with a suitable binder such as molasses, tar, sodium silica or the like. The waste sand may, also, be preheated before introduction into the mold up to practically any desired temperature, for example, to 1200° F. Before application of pressure to the mass in the mold, it should be heated to the temperature of sintering, (1600 or 1700° F.) of the glass in the sand.

It will be apparent that in the operation of this embodiment of the invention the mold 52 may be retained permanently in position in the press and each plate, after formation, may be removed by raising the head and then actuating the follower 57 upwardly to lift the plate. It is also possible to employ a series of molds which are filled consecutively and placed in the press and there heated to the operating temperature, after which the pressure head is actuated to compress the mass into coherent form. The molds are then bodily removed from the press and the freshly formed plates or plaques are removed. The plaques of course require annealing in order to reduce internal strains therein. This operation may be conducted either before or after removal of the plaques from the molds.

If desired, the molds preliminary to or after the introduction of the waste material, may be heated to or above working temperature, and by reason of the massive construction of the mold and follower, sufficient heat will be retained therein to admit of compressing and compacting the waste material in the press without application of additional heat from the burners 51.

In the form of the invention illustrated in Fig. 3 waste sand is continuously fed into a series of molds carried upon a suitable support and are then passed through a furnace or kiln, in which they are heated to the sintering temperature of the glass content. Subsequently the molds are passed under a hydraulic press where the material is strongly compacted by mechanical pressure. In this form of the invention, waste sand is introduced into the hopper 70 and feeds downwardly from the bottom thereof into a trough-like feeder 71 electrically vibrated by units 72. The feeder is similar to the one described in connection with Fig. 1 of the drawings and is supported upon a suitable platform 76.

Waste sand from the feeder drops downwardly through a chute 77 and is continuously deposited at a relatively uniform rate in a series of molds 78, which are carried upon a conveyor of chain type 79. This conveyor of course is trained about suitable driving rollers 81. The conveyor may terminate adjacent to the forward end of a heating kiln 82, or as shown in the form of the invention illustrated, it extends through openings 83 and 84 in the walls of the kiln and functions to carry the molds containing the waste material to be heated directly through the kiln. Heat is supplied to the kiln by means of a series of burners 86 disposed in proximity to the molds. The lower reach or flight 87 of the conveyor is protected from the heat generated by the burners by means of a suitable horizontal partition 88 disposed in the lower portion of the kiln.

The conveyor terminates adjacent to a hydraulic press 89 comprising a base portion 91, and a fixed head 92 carrying pressure heads 93 adapted to register with the molds. A travelling head 94 slides upon vertical guide rods 96 interconnecting the base 91 and the head 92 and is actuated upwardly by means of a hydraulically operated piston 97.

Molds containing waste sand heated to a suitable temperature, after passing through the kiln 82, may be manually or mechanically withdrawn from the conveyor and deposited upon the travelling head 94 of the press which is then actuated to apply compression to the material. The pressing operation need not require more than a second or two and after it is completed the molds containing the freshly formed plates still in highly heated condition may be passed on to a conveyor 98, which is trained about driven roller and extends through an annealing leer 100.

A form of mold suitable for use in practicing the invention is illustrated in Figs. 4 and 5. It comprises a base portion 101 which may have a rabbeted edge 102 designed to mate with a shoulder 103 about the lower edge of a grid-like member 104. The latter is divided into a series of compartments 106 of any appropriate shape and number by means of partitions 107. In the operation of these molds the grid 104 is first disposed upon the base while the latter is supported upon the conveyor 79. Subsequently the charge of sand is supplied to the molds by the filler mechanism comprising feeder 71 and the mold is carried through the kiln or furnace 82. Immediately after the sand has been compressed in the mold, or after the annealing operation, the plates or plaques may readily be removed by lifting the grids from the base, in order to permit the application of mechanical force to the bottoms of the plates, to press them from the grids.

An additional embodiment of apparatus for continuously forming waste sand into plates or plaques is illustrated in Figs. 6, 7, and 8 of the drawings. In this embodiment of the apparatus, a base 110 is provided with an upwardly-projecting hollow boss 111, constituting a bearing for a vertical shaft 112. This shaft at its upper extremity is keyed within a horizontally-disposed spider 113, carrying a mold-supporting annulus 114, which is slidably disposed upon support 115 upon base 110. Means for intermittently rotating the annulus will be described later.

A series (e. g. four) of molds 116 are disposed at appropirate intervals upon the upper surface of the annulus and may be formed of chrome steel or other heat-resistant alloy. These molds as shown in Fig. 7 are provided with follower plates 117 for removing the plates or plaques after they have been formed in the molds. The followers may be actuated upwardly by means of rigidly attached rods 118, which project downwardly through openings in the bottom of the mold and in the annulus 114.

Waste sand may be fed to the molds by suitable feeder, for example, a rotary kiln 119, the lower extremity of which is so disposed as to discharge into the molds. In order to prevent spilling of the waste sand while the molds are being rotated, from one position to the next, a trough 121, best shown in Fig. 8, is disposed beneath the lower extremity of the kiln and is secured upon shafts 122, having bearings in hangers 123, which at their upper extremities are supported upon a beam, platform, or other suitable structure 124.

One of the shafts 122 is also provided upon its inner extremity with a rearwardly and downwardly-projecting arm 126, which at its lower extremity carries a roller 127. This roller is designed to contact with and is actuated by upwardly-projecting cams 128 disposed about the inner periphery of the annulus 114. As will be apparent from Fig. 6, a cam is provided for each mold and these cams are so spaced that when the molds are disposed directly below the mouth of the kiln 119, the arm 126 will be elevated to tilt the trough 121 to discharge the waste sand accumulated therein into the mold and also to permit waste material from the kiln to fall directly into the latter. After the mold has been rotated past the filling position the arm is released from the cam and the trough again swings to the dotted line position shown in Fig. 8, to catch the material as it falls from the discharge end of the kiln.

For purposes of maintaining the temperature of the material in the mold or for purposes of increasing the temperature thereof, in event that it is not desirable to heat it to the working temperature in the kiln 119, one or more segments of the annulus 114 is inclosed by tunnel-like kilns 129, which may be heated by any convenient means (not shown). Such kilns terminate adjacent to a hydraulic press 131, disposed approximately diametrically opposite to the kiln 119. The press may be of conventional design and includes a base 132 having a bed portion 133 which may constitute a portion of the annular base 115 and provides a rigid backing for the annulus 114. An upwardly-projecting portion 134 of the base supports upon its forward face a cylinder 136 to which fluid under compression may be admitted by means of conduits 137. A piston 138 reciprocating within this cylinder carries at its lower extremity a plunger head 139, adapted to register with and to compress the material within the molds 116.

Apparatus for intermittently rotating the annulus 114 and indexing the molds 116 into register with the plunger, above described, includes an indexing disk 141 keyed to or otherwise rigidly affixed to the shaft 112. Arms 142 are journaled upon hub portions 143 of the disk and are provided with brackets or projections 144, shown in Fig. 6, constituting bearings for a pin or shaft 146. This shaft carries a pawl or dog 147, adapted to engage cam notches 148 in the edges of the disk. Oscillatory motion is transmitted to the arms 142 by means of connecting rod 149, which as indicated at 151 is hinged to the extremity of rod 152 of piston 153, that reciprocates in the cylinder 154. The latter is mounted upon a support 156 upon base 110 and is, also, provided at its opposite extremities with conduits 157, leading to a source of fluid under compression (not shown). Positive indexing of the molds in register with the press plunger 139 is effected by provision of means including appropriately spaced notches 158, formed in the outer periphery of the disk 141. These notches, when the molds are in proper register with the plunger, are engaged by the forward extremity of a piston rod 159 secured to a piston 161. This piston reciprocates in cylinder 162, upon a support 163 and is provided at its extremities with conduits 164, leading to a source of actuating fluid.

In the operation of this embodiment of the invention waste sand either in wet or dry condition is fed into the cylinder or kiln 119 in which it is heated up to an appropriate temperature. Assuming that the annulus 114 is in the position shown in Fig. 6, the dry and heated material is discharged at the lower end of the kiln into the mold 116, disposed therebeneath. During this filling operation the annulus is held stationary by the engagement of the rod 159 with the appropriate notch 158 in disk 141. After the mold has been properly filled, fluid under compression is admitted to the cylinder 162, to retract the rod from the notch. Subsequently, fluid is admitted to the rear extremity of cylinder 154, to actuate piston rod 152, and thus to rotate arm 142 through an angle of 90 degrees, thus bringing the next mold into register at the lower end of the kiln. During this rotational movement, it will be apparent that the material dropping from the lower end of the kiln is caught and retained in the bucket 121. The filled mold at the conclusion of the first movement comes to rest within the heating.

Repetition of the foregoing operation carries the mold first filled, through the furnace 129 and brings it into register with the plunger 138. The latter is then actuated by admission of fluid to the cylinder 136, in order to compress the loose, pulverulent material in the mold. Upon completion of the pressing operation the plunger is retracted and the annulus is rotated to the fourth position. Here the rod 118 is actuated upwardly either mechanically or manually to release the newly formed and still highly heated plate or plaque from the mold. The latter is then subjected to any desired finishing operations. For example, it may be coated while still relatively hot with a suitable glaze and then passed through an annealing kiln where it is gradually cooled down to temperatures at which it can conveniently be handled.

Although it is possible to obtain useful products by heating waste sand to the sintering temperature of the glass content therein without application of any substantial degree of mechanical pressure or without subjecting the mass to mechanical vibration, in order to settle the particles, it is found that for products of maximum density, hardness and strength, considerable pressure is desirable. For example, in case the material is subjected to a pressing operation it is found that a pressure of 1000 pounds per square inch and upward is desirable. Particularly satisfactory products have been obtained by application of pressures of about 5000 pounds per square inch. The upper limit of pressure of course is limited solely by the dictates of economy of operation and by the mechanical limitations of the apparatus employed. These pressures need be applied only for a brief interval, for example, a second or two and may even be applied as hammer-like impacts which are repeated a plurality of times, if desired.

The temperature at which the pressing operation is performed is found to be fairly critical and seems to be of optimum value, approximately within the range of 1600 to 1700 deg. F. The importance of the effect of temperature control upon the product will be apparent from consideration of the following table:

process may be glazed in much the same manner as a conventional porcelain body. One convenient method would involve simply dipping the bodies after they have been annealed into a slip of glaze, or by dusting with pulverulent glazing material. Subsequently the bodies are refired and at an appropriate temperature, e. g., 1100 or 1200 deg. F. and are then reannealed. A suitable formula of a glazing material for use in coating the bodies may be represented as follows: Enamel for pressed tile—

| | |
|---|---|
| Silica | 32 |
| Saltpeter | 6 |
| Soda ash | 7.5 |
| Borax | 9.5 |
| Red lead | 39.5 |
| Coloring oxide ($Fe_2O_3$) or the like | 5.5 |

It will be apparent that oxides of cobalt, iron, nickel and other coloring matters in solution or solid form may be admixed with the waste sand before it is formed into coherent bodies. Likewise, the waste sand or the bodies formed therefrom, while hot, may be colored by exposure to vapors of volatile metals or volatile compounds of metals, such as ferric chloride, oxide or compounds of cobalt, nickel, chromium, gold, silver, or the like in order to obtain colored products.

Modified products may also be obtained by treating the bodies after pressing with melted paraffin, linseed oil, molten sulfur, rosin or molten resins, such as shellac, in order superficially to coat them or to impregnate them. Moisture-proof bodies are thus obtainable.

Chemicals may also be deposited in the bodies. For example, they may be saturated with soluble compounds of metals, such as calcium, aluminum, or iron and then treated with precipitating agents to block the pores of the bodies. Suitable soluble substances would be calcium hydrate, calcium chloride, ferrous sulfate, aluminum sulfate and the like. The chemicals when dried and exposed to air would leave deposits of insoluble oxides in the interstices of the bodies. Exposure to precipitating agents, such as carbon

| Preheat temp. | Number samples tested | Porosity | Modulus of rupture | Bulk specific gravity | Remarks |
|---|---|---|---|---|---|
| | | Percent | Lbs. per sq. in. | | |
| 1600° F | 3 | 35.9 | 1322 | 1.599 | Porosity and strength variable. |
| 1650° F | 3 | 30.7 | 2769 | 1.806 | Very uniform in properties. |
| 1700° F | 4 | 33.0 | 2151 | 1.722 | Fair uniformity. |
| 1800° F | 3 | 37.9 | 1050 | 1.520 | Properties vary. |
| 1900° F | 2 | 35.3 | 1018 | 1.537 | Do. |
| 2000° F | 3 | 34.4 | 1080 | 1.556 | Do. |
| Glazed wall tile | 1 | 33.9 | 1212 | 1.747 | |

With temperatures about 1600 deg. or above about 1700 deg., the density and strength of the product fall off rapidly. It will be noted that a product prepared under optimum operating conditions possesses a density of 1.806 and a modulus of rupture of 2769 pounds per square inch. A conventional wall tile which the present material is well designed to replace possesses a density of 1.747 and a modulus of rupture of 1212.

It has already been indicated that the present material is highly resistant to chemical action because it is composed of pure silica with only a minor amount of glass contained therein. Accordingly, it is not substantially affected by the action of moisture. The bodies prepared by the dioxide, ammonia or the like might also be resorted to.

In order to promote absorption of impregnating agents, the bodies might be exposed to solutions or baths of the treating agents under strong mechanical pressure. Entrapped gases in the bodies might be drawn off under vacuum. Impregnation might be effected by forcing the fluid in by differential pressure applied to one side, or by evacuating the bodies from one side.

The bodies may be plates, placques, discs, rings, blocks, or bricks of any desired size. As such they may be used for insulating and building purposes, for packing or forming absorbers and distilling apparatus, as catalyst carriers, or as filter media in the chemical industries. Their resistance to chemical action, their indifference to moisture render them particularly satisfactory for all of these. They also bond effectively to mortars and cements, which is an important point in the fabrication of composite structures. Hollow and irregular shapes, such as dishes, containers, pipes, etc., can also be molded from the material by the foregoing methods and apparatus.

Although only the preferred forms of the invention have been described, it will be apparent to those skilled in the art that numerous modifications may be made therein without departure from the spirit of the invention or the scope of the appended claims.

What I claim is:

1. A process of preparing relatively dense and strong artificial siliceous bodies, which process comprises heating waste sand from the grinding and polishing of glass plates and comprising particles of silica from the sand admixed with particles of glass abraded from the glass plates, the mixture being of a particle size to pass a screen of about 325 mesh and containing about 12 to 20 per cent of glass abraded from the glass plates, to a temperature above the sintering point of the glass content and approximately within the range of 1600 to 1800 degrees F., then placing the heated mixture in a strong mold and while it is sitll heated subjecting it to intense mechanical pressure of about 1000 lbs. per sq. inch and upward, in order to compact the mass and to embed the particles of silica in the particles of sintered glass, then annealing and cooling the resultant body and removing it from the mold.

2. A process of preparing relatively dense and strong bodies from waste sand resulting from the grinding and polishing of glass plates, said sand being of a particle size such that most of it will pass a screen of 325 mesh and consisting essentially of finely divided silica and finely divided glass abraded from the glass plates, which process comprises heating the sand to a temperature above that of sintering of the glass content, confining it in an appropriate form, subjecting it to a pressure of approximately 1000 pounds per square inch and upward while it is at said temperature to effect a strong bond between the particles of glass and silica and then cooling and annealing the resultant coherent body.

3. A process of preparing relatively dense and strong artificial siliceous bodies, which process comprises heating waste sand from the grinding and polishing of glass plates and comprising particles of silica from the sand admixed with particles of glass abraded from the glass plates, the mixture being of a particle size to pass a screen of about 325 mesh and containing about 12 to 20 per cent of glass abraded from the glass plates, to a temperature above the sintering point of the glass content and approximately within the range of 1600 to 1800 degrees F., then while it is still heated to said temperature subjecting it to mechanical pressure of about 1000 pounds per square inch and upward in order to compact the mass and to embed the particles of silica in the particles of glass and then annealing and cooling the resultant body.

4. A process of forming shaped coherent masses from a pulverulent mixture of silica and glass consisting of waste sand from the grinding and polishing of glass with sand as an abrasive, which waste sand contains about 12 to 20 per cent of glass in the form of fine particles abraded from the glass, the waste sand being of a particle size that most of it will pass a screen of 325 mesh, which process comprises heating the waste sand to the temperature of sintering of the glass particles but not substantially above 2300° F., then rolling the heated mixture at a pressure of approximately 1000 pounds per sq. inch and upward, in order to form a coherent porous body.

GEORGE J. BAIR.